(No Model.) 2 Sheets—Sheet 1.
T. GORDON & W. R. SWIFT.
REGENERATIVE GAS BURNER.
No. 422,587. Patented Mar. 4, 1890.
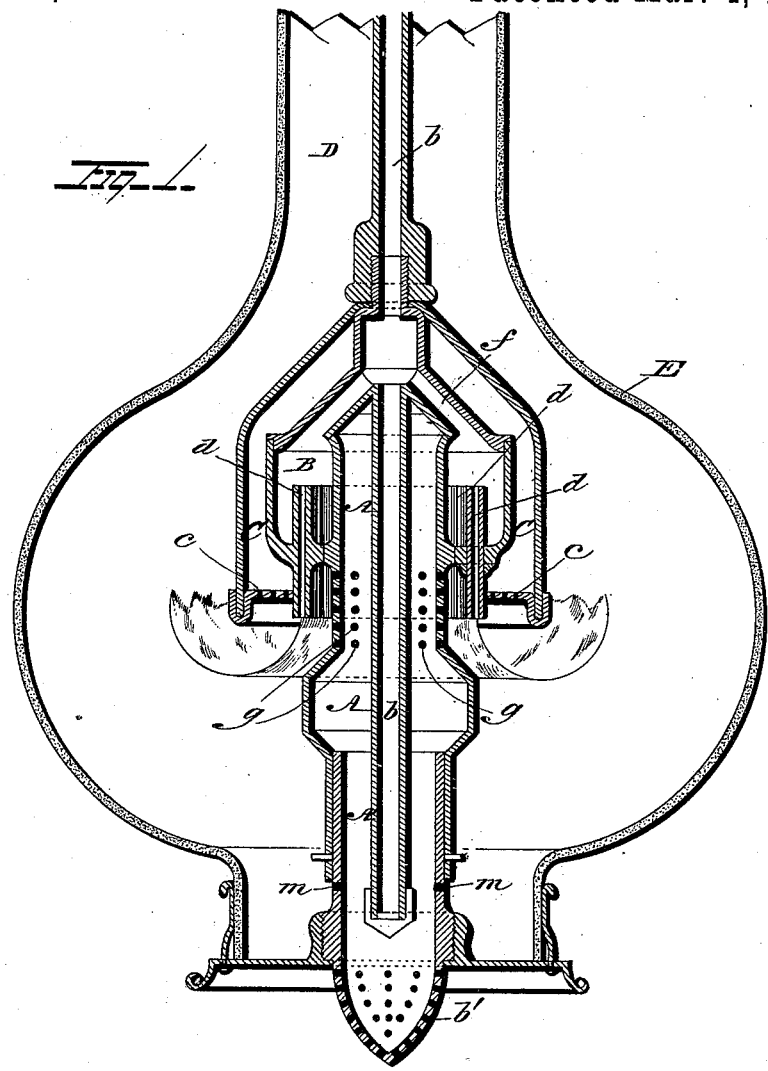
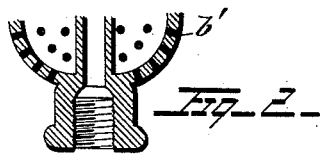
Witnesses:
Inventors
Thomas Gordon and William R. Swift

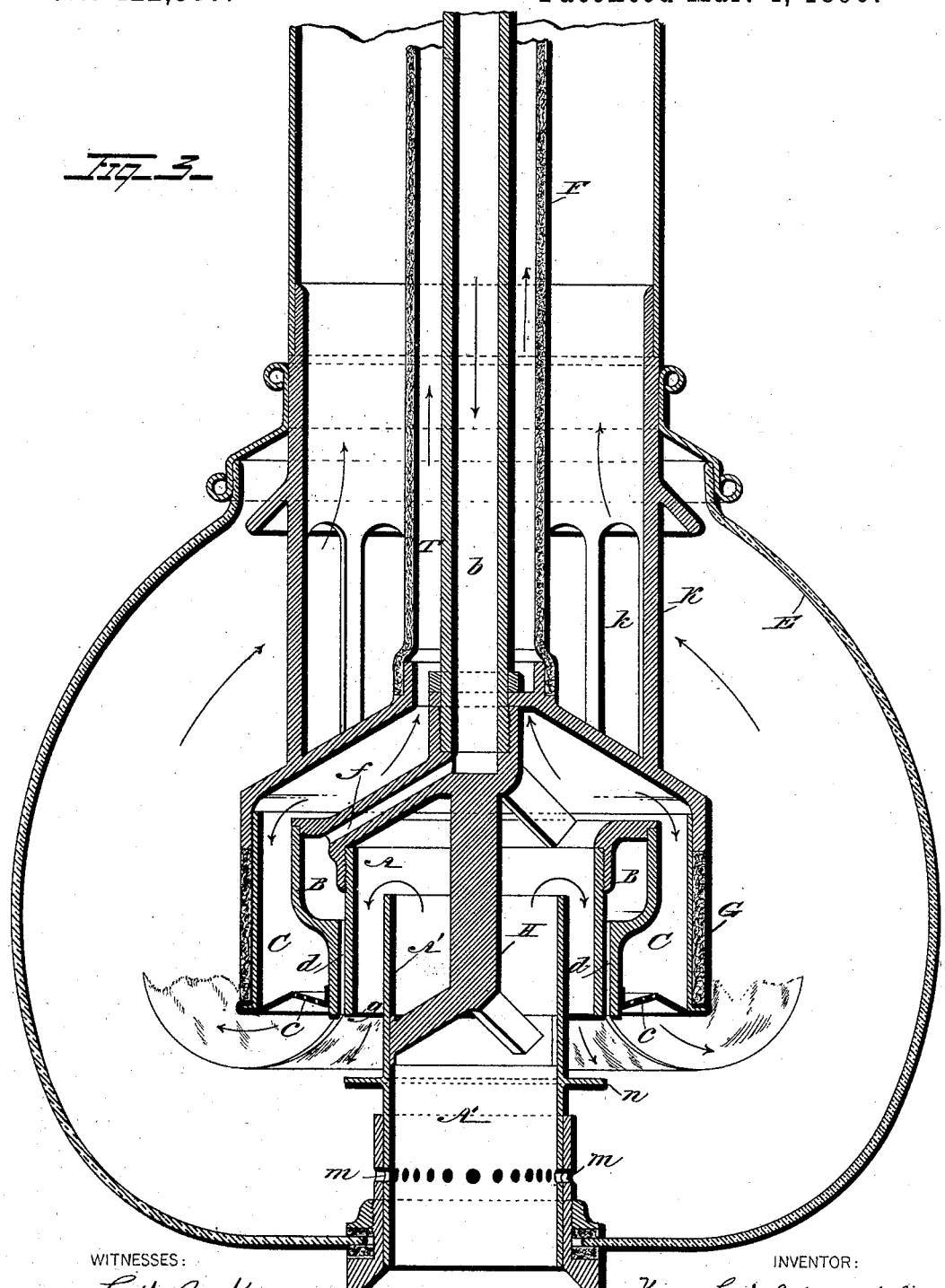

UNITED STATES PATENT OFFICE.

THOMAS GORDON AND WILLIAM R. SWIFT, OF PHILADELPHIA, PENNSYLVANIA.

REGENERATIVE GAS-BURNER.

SPECIFICATION forming part of Letters Patent No. 422,587, dated March 4, 1890.

Application filed July 16, 1889. Serial No. 317,659. (No model.)

*To all whom it may concern:*

Be it known that we, THOMAS GORDON and WILLIAM R. SWIFT, citizens of the United States, residing in the city of Philadelphia, in the State of Pennsylvania, have jointly invented certain new and useful Improvements in Regenerative Gas-Lamps, of which the following is a full, clear, and exact description, reference being had to the accompanying drawings, forming a part of this specification.

Our invention relates to regenerative gas-lamps of the inverted class; and it consists, primarily, of a novel combination of a gas-supply chamber and its inverted gas-burning tubes or orifices with and between two connected air-chambers, this form of gas-lamp being constructed on the principle of dividing the air-chamber into two compartments, the central one communicating with the open air to supply a current to the inner walls of the gas-chamber and its tubes and orifice-walls, a portion of said air being deflected and fed to the under surface of the flame, the remainder of the volume passing upward into the outer compartment of the air-chamber, heated and expanded therein, and from thence discharged into the body of the flame on the upper surface thereof at or about the point of ignition. For the general form of a lamp of that character, constructed on the principle of dividing the air-chamber into two compartments, a full description will be found in our pending application for Letters Patent therefor, Serial No. 294,349, filed December 21, 1888, our present improvement being for a novel arrangement of the parts and in several details of construction, as above mentioned and shown in the drawings hereinafter referred to, and has for its object to supply an economically-constructed regenerative gas-lamp of the inverted pattern, in which the common defect in present lamps of that character of overheating of the parts and consequent clogging of the gas-pipes is largely obviated; also, to divide the air-current so that it shall be ejected in as nearly equal quantities as may be and in a heated and expanded condition to the inner and to the under surfaces, respectively, of the flame; and to that end our invention is constructed on the principle described of dividing the air-chamber into two parts or compartments, the inner one being extended downward to the base of the lamp and communicating at that point with the open air, inclosing the top of the latter within the other and connecting the same with each other at the top, the space between the inner and outer walls of the two chambers or compartments, respectively, being closed at both top and bottom and forming a gas-magazine, from which project downward an annular or other series of gas-burner tubes, or the base of which is made thick and is pierced vertically, or nearly so, to form a series of orifices terminating in gas-jets; and our present invention has for its further object a peculiar construction and relative arrangement of the several parts, in order that a divided quantity of the incoming volume of fresh air will be deflected in its vertical passage and led off through orifices or through an annular opening at a point above the burner-tips, and be discharged thence downward to the under surface of the flame at or about the point of ignition.

In the accompanying drawings, representing our invention, Figure 1 is a vertical section of an inverted regenerative gas-lamp constructed according to our present improvement. Fig. 2 is a modification of the base of a lamp intended to show how the gas may be introduced from the bottom of the lamp instead of the top. Fig. 3 is a modification of the device shown in Fig. 1, in which the inner compartment of the air-chamber is divided into two unconnected parts, so as to form a deflector for a part of the incoming air and a passage for one division of the volume of the same downward to the under surface of the flame, and the gas-chamber is without tubes, but formed with a thickened base pierced vertically, or nearly so, to form gas-orifices terminating in jets, said figure also showing other details hereinafter mentioned.

By reference to Fig. 1 it will be seen that the air-supply chamber constructed in two parts consists of the central chamber A, having an extended lower end passing through the base of the lamp and terminating in a cap provided with perforations $b'$, which permit the entrance of fresh air into the main body of the chamber. The latter is surrounded by an annular or other form of casing, forming the outer air-chamber C, extending downward to a point slightly above the ends of the burner-tips or gas-orifices and having a closed base, which is provided with a series of perforations $c$, through which the current of air is ejected, and passes thence into the body of the flame on the upper surface thereof at or about the point of ignition.

Between the two air-compartments A and C, which open into each other at the top, is formed a gas-chamber B, which is closed both at its top and bottom, and has burner-tubes $d$, which may project for some distance within the gas-chamber, but always project below the base of the gas-magazine B, and also slightly below the base of the outer air-chamber C, or gas-jet orifices may be formed by vertical perforations through the thickened base of the gas-chamber.

Gas is supplied to the gas-magazine B through a conduit $b$, either from the top of the lamp, as shown in Figs. 1 and 3, or from the bottom of the lamp by means of a modification shown in Fig. 2, and in Fig. 1 the conduit is shown extended for a long distance down almost to the base of the fresh-air chamber, and is connected about midway with the gas-magazine B by means of hollow arms $f$, the air passing freely between the said hollow arms from the first air-chamber to the second.

An inclosing-globe E, forming a combustion-chamber of any well-known form, may be employed, Fig. 1 showing a form in which the upper portion is of itself a conduit carrying away the waste products of combustion, while in Fig. 3 a special conduit for that purpose is supplied.

In Figs. 1 and 3 are shown three different modes of construction and arrangement of the gas-jets. On the left-hand side of Fig. 1 the gas-tubes $d$ are shown constructed integral with the gas-magazine B and extend for some distance downward from the base of the magazine; or instead of tubes the base of the magazine may be thickened, as shown in Fig. 3, and vertical or nearly vertical perforations therein, forming gas-orifices, take the place of the gas-tubes of Fig. 1; and again, such tubes, when tubes proper are used, may extend for some distance up into the body of the gas-magazine for the purpose hereinafter mentioned. On the right-hand side of said Fig. 1 the gas-tubes $d$ are shown arranged in the same manner as on the left-hand side of said figure; but are made separate or screwed into or otherwise affixed to the base of said magazine, and in this case we make them of steatite, soapstone, or other non-inflammable material, but of low heat-conductive power, the object in both cases being to prevent as far as possible a transmission of primary heat at the burner-tips into the inlet ends of the gas tubes or orifices in the gas-magazine.

In Fig. 3 the gas-conduit $b$ is shown insulated from the combustion-chamber and its flue by means of a surrounding cylinder of some non-heat-conductive material, (marked F on the drawings,) whereby an annular space T is formed between the conduit $b$ and the insulating-tube F, in order that moving air in said space will tend to keep the gas-conduit $b$ in a comparatively cool condition. In said Fig. 3 is shown an escape-flue K in addition to the combustion-globe E, said flue resting upon the body of the lamp passing through the top of the globe and being provided with perforations $k$ for the draft. In said Fig. 3 is also shown a peculiar construction of the inner compartment A of the air-chamber. Instead of the lower extension A' of said chamber A being of the same diameter as the main body thereof, it is made smaller in diameter and extending up into the body of the chamber A, so as to form an annular passage for a divided current of air to flow downward to the under surface of the flame, the said smaller cylinder A' of the inner air-compartment being supported within the larger one A by means of an arm H, extending downward from the top of the inner wall of the gas-magazine or from its connecting-tubes $f$, the object of this arrangement being to supply directly from the incoming volume of fresh air a divided volume thereof in a heated condition through the annular opening $g$ to the under surface of the flame at or about the point of ignition. By this construction, due regard being had to the aggregate area of the perforations $c$ of the outer air-chamber relatively to the area of the annular opening $g$ of the inner air-chamber, we are enabled to divide the current of fresh air and deliver it simultaneously in equal volumes to the inner and under surfaces, respectively, of the flame. Other inlet air-perforations $m$ are provided in the air-supply tube A' of the chamber A to maintain an equilibrium within the inclosing globe and prevent a vacuum at the base thereof, as all the air required to feed the flame is in this construction supplied from the base of the lamp solely through the central air-supply conduit. We also show in Fig. 3 what may be desirable in large lamps to prevent the burning away of the material of the outer air-chamber—viz., an insulating-cover (marked G) of non-heat-conducting material surrounding the lower portion of the outer wall of the said chamber.

The operation of the device is as follows: Gas enters the magazine B and issues from the tips of the gas-burner tubes $d$, thus forming a flame which, aided by the deflecting-plate $n$ or by the bulging sides of the lower part of the chamber A, becomes spherical in its tendency to curve around the sides of the outer chamber C, the waste products of combustion passing upward over and around the outer walls of said chamber C, heating the same on its passage to the escape-flue. The heat from the ignition of the gas draws in a constant supply of fresh and comparatively cool air through the perforations $b'$ of Fig. 1, or through the entirely open base, as shown in Fig. 3, the latter being so provided in some cases to enable a torch to be more easily inserted to light the lamp and without opening the globe, which is an important feature in a suspended lamp. Said air will pass upward through the inner compartment of the air-chamber and circulate freely around the extended end $b$ of the main gas-supply tube and also of the connecting-arms $f$, and also of the inner wall of the gas-magazine B, the moving current of air in its fresh condition tending to keep these parts from becoming overheated. The same volume of air passes downward on its passage through the outer compartment C of the air-chamber, where it will become heated by contact with the outer walls of said chamber and be discharged in a heated and expanded state through the eduction-openings $c$ directly within the body of the ignited flame. The course of the travel of the air and gas, as above described, is shown also by arrows in the drawings. In order to divide the incoming current of air to supply the flame on the under side thereof, openings or outlets $g$ are provided in the chamber A at such points therein opposite the extended arms of the gas-burner tubes, as in Fig. 1, or as in Fig. 3 said openings are supplied by an annular opening (marked $g$) formed by the walls of different diameters of the two parts of the air-chamber, as hereinabove described, so that the deflected current of entering air will pass against the inner sides of the tubes in this construction precisely as against the vertically-orificed wall in the other, and be ejected in both cases downward in a heated and expanded condition to the under side of the flame of ignited gas, as shown in the drawings. The volumes of air thus fed to the upper and lower surfaces of the flame being thus of high temperature and expansion are regulated by the relative areas of the discharge-openings, so as to be of equal volume or pressure.

Having thus described our invention, what we claim as new, and desire to secure by Letters Patent, is—

1. A regenerative gas-lamp comprising a combustion-chamber, a gas-chamber having tubes or orifices delivering gas downward to the flame, a gas-conduit conveying the gas to said gas-chamber, an air-heating chamber surrounding the gas-chamber to a point slightly above the gas-jet orifices, and having discharge-outlets at its lower end, an inner air-chamber passing through the gas-chamber and communicating at its top with said outer air-chamber and at its base with the open air, and provided with discharge-outlets for air at points therein opposite the gas-tubes, and with other discharge-outlets for air near its base and within the combustion-chamber, substantially as described.

2. A regenerative gas-lamp comprising a combustion-chamber, a gas-chamber having a thickened base pierced with vertical orifices and forming an inverted burner, a gas-conduit conveying gas to said gas-chamber, an air-heating chamber surrounding the gas-chamber to a point slightly above the gas-jet orifices, and having discharge-outlets for air at its lower end, an inner air-chamber composed of two sections of unequal diameter partly within each other, the larger one being wholly within the gas-chamber and communicating at its top with said outer air-chamber, and the smaller one supported partly within the larger and communicating at its base with the open air, substantially as described.

3. In a regenerative gas-lamp, the combination, with a combustion-chamber, of an inverted burner delivering gas downward to the flame, an air-heating chamber surrounding the burner and provided with discharge-outlets for delivering heated air upon the upper surface of the flame, an inner air-chamber located wholly within the burner, and an air-supply tube communicating with the atmosphere at its lower end and extending upward to a point within the inner air-chamber above the level of the burner-tips, said air-supply tube being of smaller diameter than the said inner air-chamber, whereby an annular passage is provided for the downward discharge of a deflected volume of heated and expanded air to the under surface of the flame, substantially as described.

4. The combination, in a regenerative gas-lamp, of an outer casing forming the walls of an air-chamber C, a gas-magazine B with vertical orifices $d$, a gas-conduit $b$, connecting-arms $f$, an inclosing globe or a combustion-chamber, an escape-flue, a cylinder A, an air-supply tube open at its base to the atmosphere and passing through the combustion-chamber to a point above the burner-tips and supported therein by means of the arm H, substantially as described.

5. The combination, in a regenerative gas-lamp, of an outer casing forming the walls of an air-chamber C, a gas-magazine B with vertical orifices $d$, a gas-conduit $b$, hollow arms $f$, leading therefrom to the gas-magazine, an outer conduit supported upon the apex of the air-chamber C and forming an air-passage surrounding that part of the gas-conduit $b$ which is located above the combustion-chamber and within the escape-flue of the lamp, an inclosing globe or combustion-chamber, an escape-flue, and an inner air-chamber passing through the gas-chamber, communicating at its top with said outer air-chamber C, extending downward through the combustion-chamber and communicating at its base with the open air, said parts being constructed, combined, and arranged substantially as set forth.

In testimony whereof we have hereunto affixed our signatures this 29th day of June, A. D. 1889.

THOMAS GORDON.
WILLIAM R. SWIFT.

Witnesses:
CHAS. A. CARSON,
L. P. SIMPSON.